US012300802B2

(12) United States Patent
Pitchumani et al.

(10) Patent No.: US 12,300,802 B2
(45) Date of Patent: *May 13, 2025

(54) METHODS AND APPARATUS FOR PRODUCING NANOMETER SCALE PARTICLES FOR ENERGY STORAGE MATERIALS UTILIZING AN ELECTROSTERICALLY STABILIZED SLURRY IN A MEDIA MILL

(71) Applicant: U.S. SILICA COMPANY, Katy, TX (US)

(72) Inventors: Ramanan Pitchumani, Hagerstown, MD (US); William Richard Wells, Hancock, MD (US); David Earl Weller, Jr., Greencastle, PA (US)

(73) Assignee: U.S. Silica Company, Katy, TX (US)

( * ) Notice: Subject to any disclaimer, the term of this patent is extended or adjusted under 35 U.S.C. 154(b) by 405 days.

This patent is subject to a terminal disclaimer.

(21) Appl. No.: 17/654,915

(22) Filed: Mar. 15, 2022

(65) Prior Publication Data

US 2022/0209215 A1    Jun. 30, 2022

Related U.S. Application Data

(63) Continuation-in-part of application No. 17/023,531, filed on Sep. 17, 2020, now Pat. No. 11,691,155.

(51) Int. Cl.
*B02C 17/04* (2006.01)
*H01M 4/04* (2006.01)
(Continued)

(52) U.S. Cl.
CPC ......... *H01M 4/0457* (2013.01); *H01M 4/043* (2013.01); *H01M 4/366* (2013.01);
(Continued)

(58) Field of Classification Search
CPC ....... B02C 17/16; B02C 17/04; B02C 17/186; B02C 23/36; B02C 23/18; B02C 23/06
See application file for complete search history.

(56) References Cited

U.S. PATENT DOCUMENTS 5,312,055 A    5/1994  Barthelmess et al.
5,513,803 A *  5/1996  Czekai ................. B02C 17/161
                                                         977/773

(Continued)

FOREIGN PATENT DOCUMENTS

IN    202121060112    1/2022

OTHER PUBLICATIONS

Baklouti et al. "Processing of Aqueous alpha-Al2O3, alpha-SiO2, and alpha-SiC Suspensions with Polyelectrolytes," Journal of the European Ceramic Society, 1997, pp. 1387-1392, vol. 17.

(Continued)

*Primary Examiner* — Faye Francis
(74) *Attorney, Agent, or Firm* — The Webb Law Firm

(57) ABSTRACT

Disclosed herein are methods and apparatus for producing nanometer scale particles for electrochemical materials utilizing an electrosterically stabilized slurry in a media mill. The method includes adding to a media mill a feed substrate suspension including a liquid carrier medium and electrochemical feed substrate particles. The method further includes adding to the feed substrate suspension in the media mill an electrosteric dispersant that includes a polyelectrolyte. Still further, the method includes operating the media mill for a period of time to comminute the feed substrate particles, thereby forming nanometer scale particles having a ($D_{90}$) particle size of less than about one micron, and recirculating for further grinding the nanometer scale particles from the media mill.

18 Claims, 11 Drawing Sheets

(51) Int. Cl.
  *H01M 4/36* (2006.01)
  *H01M 4/38* (2006.01)
  *H01M 4/58* (2010.01)
  *H01M 4/583* (2010.01)
  *H01M 50/434* (2021.01)

(52) U.S. Cl.
  CPC ........... *H01M 4/386* (2013.01); *H01M 4/387* (2013.01); *H01M 4/5805* (2013.01); *H01M 4/5815* (2013.01); *H01M 4/583* (2013.01); *H01M 50/434* (2021.01)

(56) References Cited

U.S. PATENT DOCUMENTS

| | | | |
|---|---|---|---|
| 5,556,038 | A | 9/1996 | Nakamura et al. |
| 5,624,604 | A | 4/1997 | Yasrebi et al. |
| 5,662,279 | A * | 9/1997 | Czekai ................. B02C 17/161 977/773 |
| 5,695,130 | A | 12/1997 | Csendes |
| 5,826,807 | A | 10/1998 | Csendes |
| 5,902,711 | A | 5/1999 | Smith et al. |
| 6,010,085 | A | 1/2000 | Angeletakis |
| 6,193,844 | B1 * | 2/2001 | McLaughlin .......... D21H 21/52 162/175 |
| 7,014,134 | B2 | 3/2006 | Heinzelmann et al. |
| 7,896,267 | B2 | 3/2011 | Ishigaki et al. |
| 2004/0251329 | A1 | 12/2004 | Hsu et al. |
| 2005/0199556 | A1 * | 9/2005 | Zhang ..................... B09C 1/002 210/757 |
| 2008/0021147 | A1 | 1/2008 | Lin |
| 2008/0197218 | A1 | 8/2008 | Ishigaki et al. |
| 2008/0245912 | A1 | 10/2008 | Boulanger et al. |
| 2009/0084874 | A1 | 4/2009 | Alam et al. |
| 2011/0165421 | A1 | 7/2011 | Schlesinger et al. |
| 2013/0264406 | A1 | 10/2013 | Morioka et al. |
| 2014/0001294 | A1 | 1/2014 | Allen |
| 2014/0246398 | A1 | 9/2014 | Zaghib et al. |
| 2015/0096467 | A1 | 4/2015 | Trivedi et al. |
| 2015/0158728 | A1 * | 6/2015 | Liang ..................... H01M 4/625 252/506 |
| 2016/0016176 | A1 | 1/2016 | Melick et al. |
| 2018/0108904 | A1 | 4/2018 | Gaben et al. |
| 2019/0198837 | A1 | 6/2019 | Yushin et al. |
| 2022/0209215 | A1 | 6/2022 | Pitchumani et al. |

OTHER PUBLICATIONS

ISA-EPO, International Search Report issued in IA PCT/US2021/071462, dated Jan. 10, 2022.

Ohenoja, K. "Particle Size Distribution and Suspension Stability in Aqueous Submicron Grinding of $CaCO_3$ and $TiO_2$", Dissertation. ACTA Universitatis Ouluensis, Jan. 10, 2014, p. 30, figures 7, 8 and pp. 41-46.

Verhiest, K. et al. "Formulation and preparation of low-concentrated yttria colloidal dispersions", Ceramics International, Nov. 22, 2011, pp. 2701-2708, vol. 38, No. 4.

\* cited by examiner

Electrosteric Stabilization

METHODS AND APPARATUS FOR PRODUCING NANOMETER SCALE PARTICLES FOR ENERGY STORAGE MATERIALS UTILIZING AN ELECTROSTERICALLY STABILIZED SLURRY IN A MEDIA MILL

CROSS-REFERENCE TO RELATED APPLICATIONS

This application is a continuation-in-part of U.S. patent application Ser. No. 17/023,531, filed Sep. 17, 2020, which is incorporated by reference herein in its entirety.

TECHNICAL FIELD

The present disclosure generally relates to methods and apparatus for producing ultra-fine particles for a variety of industrial and commercial purposes, including the preparation of energy storage materials and/or devices. More particularly, the present disclosure relates to methods and apparatus for producing nanometer scale particles utilizing an electrosterically stabilized slurry in a media mill, such as ball mills, planetary mills, conical mills, and stirred media mills. The nanometer scale particles may be used in the production of energy storage materials, e.g. as battery precursor materials for use in electrodes and/or separators for batteries and capacitors.

BACKGROUND

Media milling generally refers to a process by which particles of media of a relatively larger size are broken-down into a relatively smaller size through the application of mechanical work. Conventional milling methods include dry milling and wet milling. In dry milling, air (or an inert gas) is used to keep particles in suspension while the mechanical work is applied to the particles. As the particle size decreases, however, fine particles tend to agglomerate in response to van der Waals forces, which limits the capabilities of dry milling. Wet milling, in contrast, uses a liquid such as water or organic solvents such as alcohols, aldehydes, and ketones to control re-agglomeration of fine particles. As such, wet milling is typically used for comminution of submicron-sized particles. Another process to make submicron particles is jet milling. This is a dry process that uses supersonic air or steam. However, it is very expensive as it is highly energy intensive.

In conventional practice, a wet mill typically includes a milling media which, when subjected to mechanical work such as stirring or agitation, applies sufficient force to break particles that are suspended in a liquid medium. Milling devices are categorized by the method used to impart the mechanical work to the media. The works imparted in wet mills may include stirring, tumbling, vibratory motion, planetary motion, agitation, and ultrasonic milling, among others.

Of the foregoing mill types, the stirred media mill, which utilizes balls of various sizes as its milling media and stirring as its method for applying mechanical work, has several advantages for particle comminution including high energy efficiency, high solids handling, narrow size distribution of the product output, and the ability to produce homogeneous slurries. Variables that may be considered in using a stirred media mill include, for example, agitator speed, suspension flow rate, residence time, slurry viscosity and concentration, solid size of the in-feed particles, milling media (i.e., ball) size, media fill rate (i.e., the amount of beads in the mill chamber), and desired product size.

Despite these advantages, however, stirred media mills suffer from several drawbacks as the desired product particle size decreases below about 1 micron and especially below about 500 nanometers. For example, in the sub-micron particle size range, the behavior of the product suspension (slurry) is increasingly influenced by particle-particle interactions. Due to these interactions, spontaneous agglomeration of particles may occur, and the viscosity of the product suspension increases. When product particle sizes are below about 1 micron, these interactions may lead to an equilibrium state between agglomeration, deagglomeration, and comminution, resulting in no further comminution progress even with an increasing energy input. Moreover, particle agglomeration, along with an increase in viscosity of the product suspension, which increases the required power consumption due to a high load on the motor mill, may cause a blockage of the media mill screen and no further flow of the suspension, preventing any particles from exiting the mill as product.

Various methods have been attempted to inhibit these re-agglomeration effects. For example, electrostatic stabilization methods have been used to maintain particle separation during milling. As illustrated in FIG. 1, electrostatic stabilization involves creating like charges on the surface of colloidal particles so that the particles repel each other, thereby dispersing the suspension of the particles. Electrostatic stabilization methods may be performed by adjusting the pH of the product suspension. Adjustment of pH may be controlled by the addition of either acids or bases, including weak and strong acids as well as weak and strong bases. Electrostatic stabilization methods may alternatively be performed by adding anionic or cationic dispersing agents to the product suspension. These dispersants electrostatically stabilize the product suspension by adding a positive or negative charge to the particles when the dispersant is adsorbed on the surface of the particles.

These electrostatic methods suffer from several drawbacks, however, making them difficult to implement in industrial-scale manufacturing. Particularly, using electrostatic methods, constant monitoring and adjustment of the process is required, due to the fact that as the particle sizes decrease, their surface area increases, and any acid/base or dispersant added becomes less effective. As the specific surface area of the particles increase exponentially and the particle size decreases, greater and greater amounts of acid, alkali, or dispersants are required, and if the amount thereof deviates even slightly from the required amount, the entire suspension is susceptible to flocculation, and no more milling would be possible due to a sharp increase in viscosity and blockage of the mill screen.

In other examples, steric stabilization methods have been used to maintain particle separation during milling Steric stabilization methods utilize nonionic or electroneutral dispersants to separate the particles in suspension. As illustrated in FIG. 2, steric stabilization involves adsorbing relatively long chain polymeric compounds onto the surface of the particles. Parts of the polymer become strongly attached to the surface of particles, whereas the rest of the polymer may trail freely in the liquid medium of the suspension. If the liquid medium is a good solvent for the polymer, inter-penetration of polymer chains, i.e., the interaction of polymers on separate particles, is not energetically favorable. As a result, individual particles repel each other (inter-particle repulsion), thereby dispersing the suspension.

Like the electrostatic methods, however, these steric methods suffer from several drawbacks, making them difficult to implement in industrial-scale manufacturing. For example, steric stabilizing dispersants have the disadvantage that large quantities of dispersants are required as smaller and smaller particle sizes are generated. During milling, the surface area of the particles increases exponentially, and adsorption of these the dispersants on the surface of the particles reduces, making the milling process difficult to control.

One area of particular growing interest for processes that can realize benefits from nanometer scale particles is in energy storage materials and systems. Significant efforts continue toward the development of renewable energy sources combined with cost effective energy storage, such as batteries, to store power during excess generation and supply during peak demand. In this respect, development of low-cost, scalable energy storage systems with adequate cycle-life and safety is critical. Moreover, attaining high energy density without jeopardizing safety is also important to a number of applications, such as electric vehicles and consumer electronics, such as mobile phone and laptop.

With regard to nanometer scale particles and energy storage materials (e.g. for batteries), it is known that certain material factors can greatly influence performance. For example, increasing the surface area of an electrode will result in improvements in the efficiency of the electrochemical reaction and facilitate the ion exchange between electrode and electrolyte, especially within an anode, as higher surface area permits shorter diffusion paths to the lithium-ions between anode particles. The greater surface area does present some limitations, however, due to the degradation of interactions of the electrolyte at the surface of the electrode, resulting in a loss in capacity and thermal stability. Nanoparticles thus hold much promise to increase surface area without such capacity loss, which would facilitate fast charging, efficient discharge rates, and improved capacity of the battery.

The size, shape, and tortuosity of electrode pores will also significantly affect ion (e.g. lithium ions) transport rates through the electrolyte retained within the porous structure of an electrode. Electrode microstructure resulting from the manufacturing process has a direct influence on energy density, power, lifetime, and reliability of the lithium-ion cell. As such, a better understanding of the interconnectivity of adjacent pores, closed pores, and channels that may be created during the manufacturing process helps to ensure optimal electrolyte and electrode interaction. Knowing the tortuosity of a porous electrode and electrolyte interface makes it possible to determine if cell performance limitations are due to its microstructure.

Other physical properties exhibit large effects as well. For example, particle shape will affect properties such as packing density, since spherical-shaped particles will pack more densely than fibrous or flake-shaped particles. The density of the electrodes, such as graphite anodes, has an effect on its ability to withstand degradation under challenging load and discharge operations. A higher anode electrode particle density decreases the porosity resulting in a lower active surface area of the electrode. This reduces the electrode/electrolyte contact area. Similarly, the electrode porosity structure has a direct influence on particle-to-particle contact between the active material and the conductive diluent. By controlling porosity, higher intra-electrode conductivity can be achieved to ensure adequate electron exchange as well as sufficient void space for electrolyte access/transport of lithium ions (for example) for intercalation of the cathode. Conversely, porosity blocking/clogging during intercalation can lead to capacity fade.

Chemical composition is not the only way to affect electrochemical properties of electrode materials. To get the best possible performance out of a cathode material, particle size and morphology need to also be considered. In addition, successful lithiation is the most important factor defining the capacity of cathode materials. Precursors with different physical properties, such as particle size and porosity, have different requirements for lithiation time and temperature. In addition to porosity, particle size distribution has an influence on final volumetric capacity and cycling stability.

Particle size of electrode materials is also important, owing to the influence on capacity, cycling, and coulomb efficiency. Particle size will impact the amount of solid-state diffusion of lithium ions that intercalate at the electrode. Smaller particles, especially nanoparticles, will lead to smaller volume changes upon cycling. This contributes to less mechanical stress, increased hardness, and greater resistance to fracture. Interestingly, it has been reported that a broad particle size distribution may increase the energy density more than a mono-dispersed distribution. As such, controlling and customizing particle size distribution can result in the ability to make available custom tuning that will result in high-power (mono-dispersed) or high-energy density (poly-dispersed) materials.

One such application that could benefit from such tailoring and control is Li-ion battery production. The advantages of nanomaterials associated with Li-ion battery applications in particular are (i) they offer new reactions which cannot take place in micrometer size particles (for example, the reaction of transition metal compounds with Li leads to the in situ formation of metal nanoparticles embedded in a $Li_2X$ matrix, where X=O, S, F or N); (ii) nanostructured materials provide short path lengths for both Li+-ion diffusion and electron transport in comparison with micron-sized particles and therefore can enhance the charge/discharge rate; (iii) short path length for electronic transport can allow utilizing materials having low electronic conductivity; (iv) an increased electrode/electrolyte contact area can also lead to enhanced charge/discharge rates; and (v) nanomaterials can accommodate large volume expansion/contraction associated with Li+-ion transport and preserve the integrity of the electrode leading to longer cycle-life. Unfortunately, despite these promising effects, the disadvantages include (i) a high surface area can increase undesirable electrode/electrolyte reactions resulting in the formation of solid electrolyte interface (SEI) leading to self-discharge, poor cycling, low calendar life and poor safety of the cell; and (ii) inferior packing of particles.

Accordingly, it would be desirable to provide improved methods for producing particles in the sub-micron range using wet milling processes. The wet milling processes would beneficially maintain particle separation as the particle size decrease below 1 micron to avoid agglomeration and mill screen blockage. Moreover, the wet milling processes would beneficially be suitable for industrial-scale manufacturing to the extent that extremely tight control of any additives would not be required to prevent product suspension flocculation or steep increases in viscosity. Such improved methods, when used with particular precursor materials suitable for use in energy storage devices, could beneficially provide sub-micron particulate materials useful for preparing improved energy storage materials such as electrodes and separators for batteries, supercapacitors, etc. Furthermore, other desirable features and characteristics of the vibration isolator assemblies will become apparent from the subsequent detailed description and the appended claims, taken in conjunction with the accompanying drawings and the preceding background.

BRIEF SUMMARY

Disclosed herein are methods and apparatus for producing nanometer scale particles utilizing an electrosterically stabilized slurry in a media mill. In accordance with one embodiment, a method for producing nanometer scale particles includes adding to a media mill a feed substrate suspension. The feed substrate suspension includes a liquid carrier medium and feed substrate particles. The method further includes adding to the feed substrate suspension in the media mill an electrosteric dispersant. The electrosteric dispersant includes a polyelectrolyte, various examples of which are listed in greater detail below. Still further, the method includes operating the media mill for a period of time to comminute the feed substrate particles, thereby forming nanometer scale particles having a ($D_{90}$) particle size of less than about one micron, and recirculating for further grinding the nanometer scale particles from the media mill.

In accordance with another embodiment, a media mill apparatus configured for producing nanometer scale particles includes a milling chamber, an agitator extending into the milling chamber, a milling media disposed within the milling chamber, and a feed substrate suspension including a liquid carrier medium and feed substrate particles, and disposed within the milling chamber and interspersed with the milling media. The media mill apparatus further includes an electrosteric dispersant including a polyelectrolyte mixed within the feed substrate suspension. The agitator is configured to apply mechanical work to the milling media for a period of time, thereby causing the milling media to comminute the feed substrate particles to form nanometer scale particles having a ($D_{90}$) particle size of less than about one micron.

In accordance with yet another embodiment, a method is provided for producing nanometer scale particles in a media mill including a milling media, wherein the method includes adding to the media mill a feed substrate suspension. The feed substrate suspension includes a liquid carrier medium including water or an organic solvent and feed substrate particles including any solid material that needs to be ground to small sizes, such as organic and inorganic solids, glass, graphene, metals, minerals, ores, silica, diatomaceous earth, clays, organic and inorganic pigments, pharmaceutical materials, or carbon black. The feed substrate particles are present in the feed substrate suspension in an amount of about 5% to about 70% by weight of the feed substrate suspension, or from about 5% to about 40% by weight. The method further includes adding to the feed substrate suspension in the media mill an electrosteric dispersant. The electrosteric dispersant includes a polyelectrolyte. The polyelectrolyte includes a polymer or copolymer having electrically-charged functional groups or inorganic affinic groups. The electrosteric dispersant is added in an amount of about 2% to about 20% by weight of the feed substrate particles. The method further includes operating the media mill for a period of time of about 10 minutes to about 6,000 minutes to comminute the feed substrate particles, thereby forming nanometer scale particles having a ($D_{90}$) particle size of less than about one micron, recirculating for further grinding the nanometer scale particles from the media mill, and separating the nanometer scale particles from the milling media. Still further, the method includes drying the nanometers scale particles after separating the nanometer scale particles from the milling media.

In additional embodiments, a method is provided for preparing nanometer scale particles for electrochemical materials. The method includes adding to a media mill a feed substrate suspension. The feed substrate suspension includes a liquid carrier medium and electrochemical feed substrate particles. The method further includes adding to the feed substrate suspension in the media mill an electrosteric dispersant. The electrosteric dispersant includes a polyelectrolyte, various examples of which are listed in greater detail below. Still further, the method includes operating the media mill for a period of time to comminute the feed substrate particles, thereby forming nanometer scale particles having a ($D_{90}$) particle size of less than about one micron, and recirculating for further grinding the nanometer scale particles from the media mill. The method includes drying the nanometers scale particles, such as via spray drying, optionally after separating the nanometer scale particles from the milling media. In some embodiments, the recirculating and further grinding of the nanometer scale particles from the media mill prepares a slurry, and the method includes directly spray drying the slurry to give the nanometer scale particles as a dry powder.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
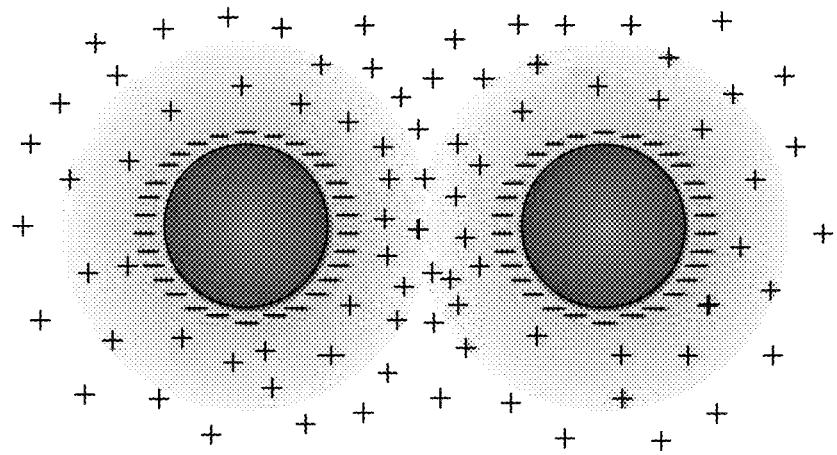
FIG. 1 is a conceptual illustration showing product suspension particle separation utilizing electrostatic methods, as practiced in the prior art.
Figure 2:
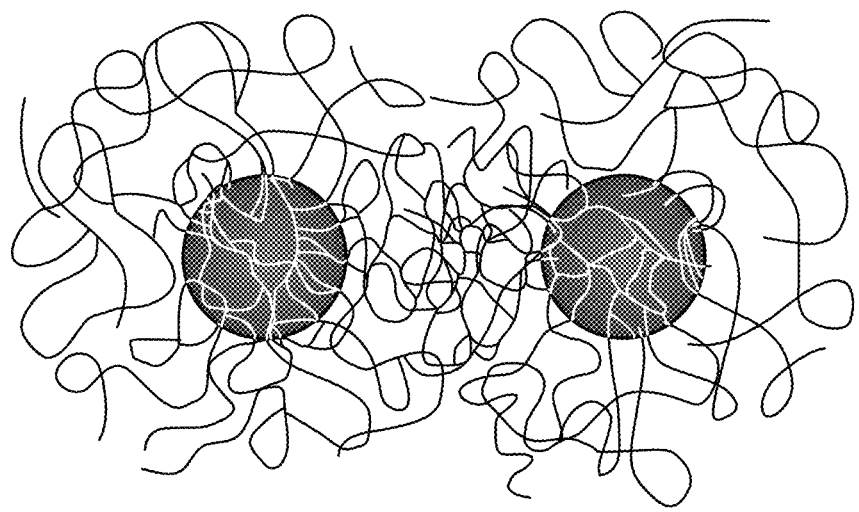
FIG. 2 is a conceptual illustration showing product suspension particle separation utilizing steric methods, as practiced in the prior art.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Disclosed herein are embodiments of methods and apparatus for producing nanometer scale particles utilizing an electrosterically stabilized slurry in a media mill. The disclosed embodiments makes use of electrosteric (electrostatic and steric) stabilization of ultra-fine (sub-micron) particles in a wet milling process using electrosteric dispersants. Electrosteric dispersants are polymers that are capable of stabilizing product particle suspensions electrostatically as well as sterically. With electrosteric dispersants, there is reduced use of the dispersant, the amount of dispersant used need to be controlled to an exacting standard, and agglomeration of the particles is efficiently avoided. This enables an increased milling efficiency and a reduced energy consumption for the wet milling process because the viscosity of the suspension remains low, and further there is a reduced probability of mill screen blockage because of the reduced probability of agglomeration.

The nanometer scale particles in accordance with the present disclosure may represent a variety of substances useful in a variety of industries. For example, particles that may be milled as described herein may include inorganic and organic solids, minerals, ores, silica, diatomaceous earth, clays, organic and inorganic pigments, pharmaceutical materials, carbon black, paint additives, pigments, photographic materials, cosmetics, chemicals, metal powders useful as catalysts and supports, stationary phase particles useful in analytical and preparative chromatographic separations of chemical compounds, powdered toners, therapeutic and diagnostic imaging agents, medicinally active agents, medicaments, plant and herbal extracts, drugs, pro-drugs, drug formulations, and the like. As described in further detail below, in some embodiments the method is utilized to prepare the nanometer scale particles for use in preparing electrochemical materials, e.g. electrodes, separators, etc. for energy storage devices.

In accordance with the methods of the present disclosure, nanoscale particles have been demonstrated having ($D_{90}$) mean particle sizes below one micron, for example below 800 nanometers (nm), or below 500 nm. As set forth in the examples below, using input particles having a $D_{90}$ mean particle size of about 5 microns, product particles have been prepared having $D_{10}$ mean particle sizes of about 100 nm to about 200 nm, $D_{50}$ mean particle sizes of about 150 to about 250 nm, and $D_{90}$ mean particle sizes of about 250 nm to about 350 nm. It is expected that particles within the aforementioned size range, or anywhere between the aforementioned size range and an input size of ($D_{90}$) about 100 microns or less (such as about 50 microns or less, or about 30 microns or less, or about 10 microns or less), will find application in almost any industrial or commercial application currently practiced. Greater detail regarding the wet media milling process, along with the electrosteric dispersants used in the milling process, is provided below. In particular, two embodiments of a mill are disclosed below in connection with FIG. 3A (vertical wet media mill) and FIG. 3B (horizontal media mill).

Wet Media Milling

In a wet milling process, repeated collisions of milling media with a solid particle material being milled, i.e., the milled substrate, result in repeated fracture of the substrate and concomitant substrate particle size reduction. When a wet media milling process is used to reduce the size of particles of the substrate, the process is usually carried out in a mill including a milling chamber containing milling media, the solid material or substrate that is to be milled, and a liquid carrier in which the media and substrate are suspended. The contents of the milling chamber are stirred or agitated with an agitator that transfers mechanical work and energy to the milling media. The accelerated milling media collide with the substrate in energetic collisions that may crush, chip, fracture, or otherwise reduce the size of the solid substrate material and lead to an overall reduction in substrate particle size, and an overall reduction in substrate average or mean particle size distribution. Examples of suitable wet milling systems include ball mills, planetary ball mills, circulating stirred media mills, basket stirred media mills, ultrasonic media mills, and the like.

Milling media are generally selected from a variety of dense and hard materials, such as sand, steel, silicon carbide, ceramics, zirconium silicate, zirconium and yttrium oxide (e.g. yttria stabilized zirconia), glass, alumina, titanium, and certain polymers such as crosslinked polystyrene and methyl methacrylate. Media geometries may vary depending on the application, although spherical ball-shapes or cylindrical beads are commonly used. In some embodiments, milling media may be of various sizes and size distributions that include large milling media particles and smaller milling media particles. Suitable liquid carriers for the milling media and substrate include water, aqueous salt solutions, buffered aqueous solutions, organic solvents such as ethanol, methanol, butanol, hexane, hydrocarbons, kerosene, PEG-containing water, glycol, toluene, petroleum-based solvents, mixtures of aromatic solvents such as xylenes and toluene, heptane, and the like. Typically, the solvent will be selected based upon the substrate (product) particles.

Wet media mills useful for reducing the particle size of a solid substrate may operate in a batchwise mode or in a continuous or semi-continuous mode. Wet media mills operating in a continuous mode may incorporate a separator or screen for retaining milling media together with relatively large particles of the solid substrate being milled in the milling zone or milling chamber of the mill while allowing smaller particles of the substrate being milled, i.e., product substrate particles, to pass out of the milling chamber in either a recirculation or discrete pass mode. Recirculation may be in the form of a slurry, suspension, dispersion, or colloid of the substrate suspended in a fluid carrier phase that moves from the milling chamber into a holding vessel and thence back to the milling chamber, for example with the aid of a pump. A separator or screen may be located at the outlet port of the milling chamber, including for example rotating gap separators, screens, sieves, centrifugally-assisted screens, and similar devices to physically restrict passage of milling media from the mill. Retention of milling media occurs because the dimensions of the milling media are larger than the dimensions of the openings through which the reduced size substrate particles may pass.

Figure 3A:
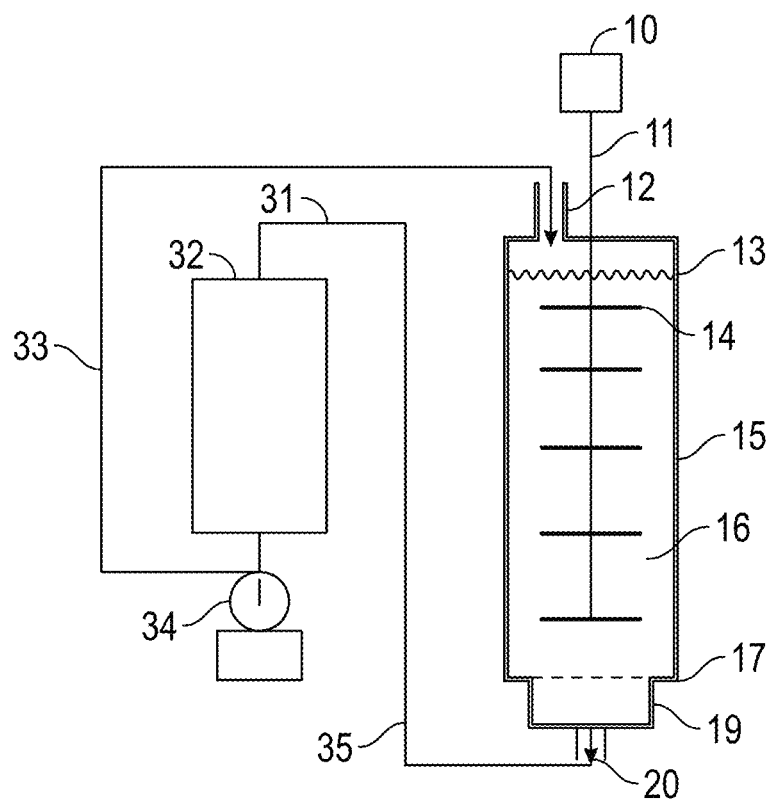
FIGS. 3A and 3B are schematic drawings of a wet media mill useful in milling particles in a continuous process in accordance with some embodiments of the present disclosure.

FIG. 3A depicts an exemplary vertical wet media mill 15 configured for use in accordance with some embodiments of the present disclosure, wherein the reference numerals correspond with the following illustrated features:

10: motor
11: shaft
12: entry port
13: charging level
14: agitator
15: media mill
16: milling chamber
17: secondary screen
19: exit screen
20: exit port
31: inlet port
32: holding tank
33: piping system
34: pump
35: piping system The exemplary wet media mill 15 is now described in accordance with its usual operation. In an embodiment, a milling media (not shown) and a fluid carrier that contains an electrosteric dispersant may be added to milling chamber 16 of media mill 15 through entry port 12. (The electrosteric dispersant is described in greater detail, below.) During this charging of the media mill 15, agitator 14 may optionally be in operation, and exit port 20 may be open to allow fluid carrier to exit from the media mill 15, or it may be closed to contain the fluid carrier. Optionally, a secondary larger screen 17 including openings through which the milling media may pass may be provided in the media mill 15.

The milling chamber 16 may then be charged with the solid substrate to be milled and optionally additional fluid carrier (optionally including additional electrosteric dispersant). Additionally, the milling chamber 16 may further be charged with a defoaming agent that prevents bubble formation during the milling process, as known in the art. In embodiments, once all of the fluid carrier and the substrate has been added, the slurry may have a solids content from about 5 wt.-% to about 40 wt.-%, such as from about 10 wt.-% to about 40 wt.-%, or about 15 wt.-% to about 40 wt.-%, or about 20 wt.-% to about 40 wt.-%. The exit port 20 of the milling chamber 16 may then be closed and the media mill 15 may be charged to a level 13. Fluid carrier may be transferred using a piping system 35 with the aid of a pump 34 to a holding tank 32 via inlet port 31. The fluid carrier may be pumped from the holding tank 32 via the piping system 33 back to the inlet port 12 of the media mill 15.

The contents of the media mill 15 are agitated or stirred, preferably at a high speed or with high acceleration and deceleration, by agitator 14 that is driven by motor 10 and coupled with shaft 11. The time period of agitation to produce a product in accordance with the present disclosure may range, for example, from about 10 minutes to about 6,000 minutes or more, such as about 10 minutes to about 3,000 minutes, or about 10 minutes to about 1,000 minutes. Fluid carrier is continuously recirculated from the milling chamber 16 to the holding tank 32. This recirculation may be continued until a minimum or a desired substrate particle size is obtained, for example within the mean particle size ranges described above. During this process, additional electrosteric dispersant may be added, as required.

At the end of the process, the residual product particles of milled solid substrate remaining in the media may be transferred to the holding tank 32 as a dispersion in the fluid carrier, optionally under pressure or by means of pump 24 from the milling chamber 16. Essentially all milling media remain in the milling chamber 16, and the product substrate particles are isolated substantially free of milling media as a dispersion in the fluid carrier. The product substrate particles produced in accordance with the present disclosure may have a ($D_{90}$) particle size of less than about one micron, such as less than about 800 nm, or less than about 500 nm. The fluid carrier may be removed by drying or baking, as is known in the art. The electrosteric dispersant may remain with the milled product after drying in some embodiments, whereas in other embodiments the electrosteric dispersant may be removed, for example by baking in a kiln. Removal of the electrosteric dispersant will depend on final product requirements and intended application. In certain embodiments, as described further below, the dispersion of the particles of milled solid substrate in the fluid carrier product may be spray dried (e.g. via pumping through a nozzle with high pressure air to form droplets, and subsequently heating the droplets) to isolate and give the give the nanoparticles as a dry powder.

Figure 3B:
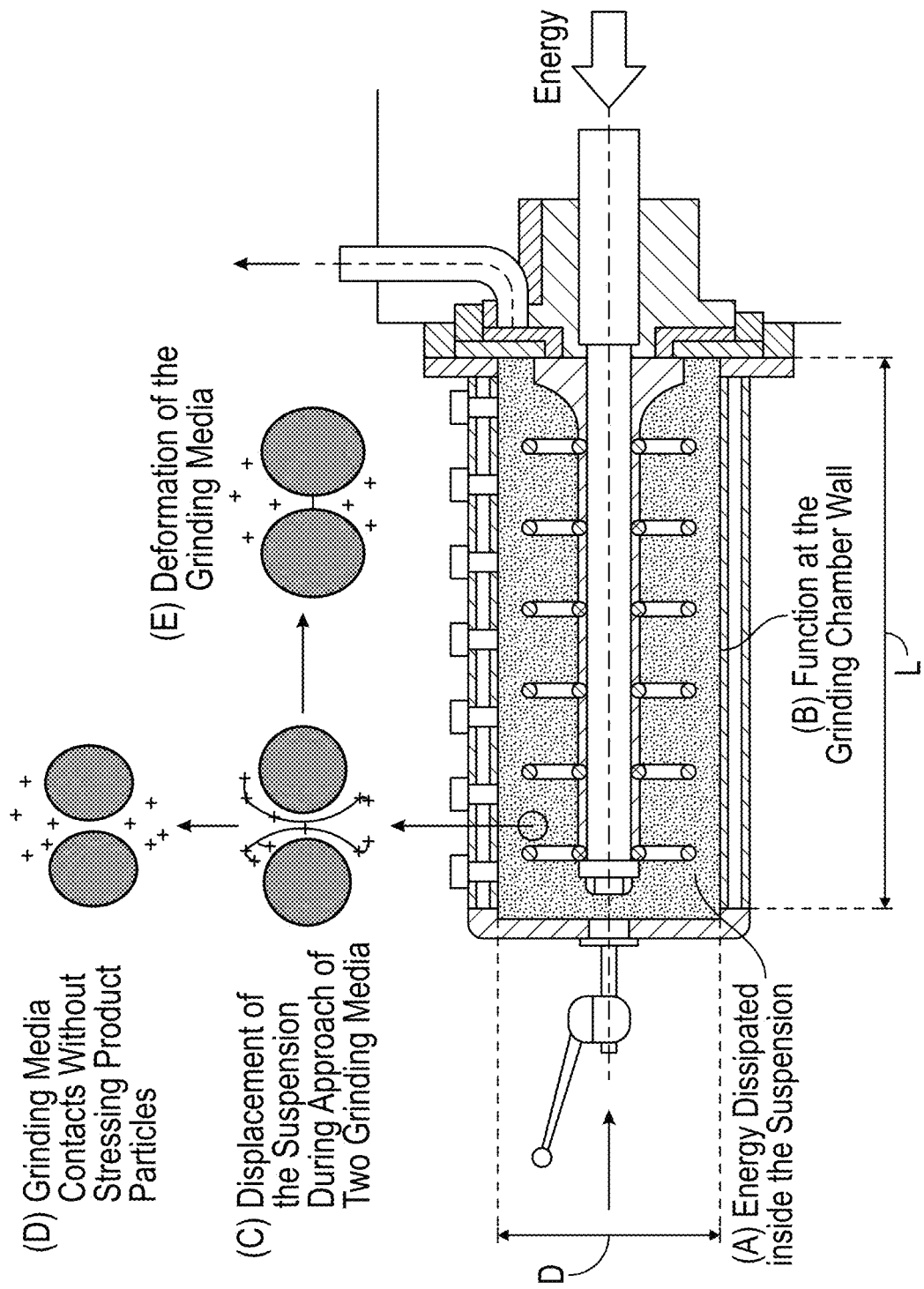

FIG. 3B presents an alternative embodiment of a stirred media mill, namely a horizontal media mill. Many of the physical components of the embodiment of FIG. 3B are similar to that of FIG. 3A, as both embodiments accomplish the same function. In FIG. 3B, however, attention is drawn to the particular functions that occur in each area of the mill, with reference to illustrated functions (A) through (E). As illustrated, at function (A), energy that is input to the mill through the shaft is dissipated inside the suspension. At function (B), friction occurs in the suspension where the agitator is near the chamber wall. At function (C), displacement occurs within the suspension during the approach of two or more pieces of grinding media towards one another. At function (D), the grinding media contact one another without causing stress to the suspended particles. Further, at function (E), the grinding media may be deformed temporarily after the contact.

Electrosteric Dispersants

Figure 4:
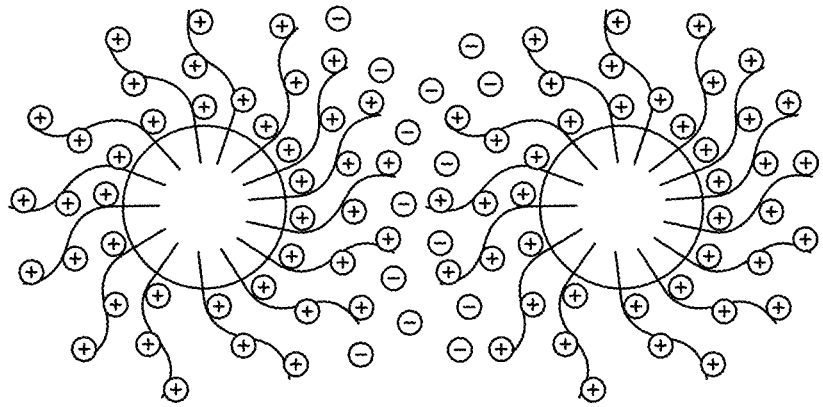
FIG. 4 is a conceptual illustration showing product suspension particle separation utilizing electrosteric methods in accordance with some embodiments of the present disclosure.

Greater detail is now provided regarding the electrosteric dispersants utilized in the wet media milling processes of the present disclosure. The electrosteric dispersants provide electrosteric stabilization to the product particles. Electrosteric stabilization is a combination of electrostatic and steric stabilization. With reference to FIG. 4, electrosteric stabilization involves adsorbing charged polymers (polyelectrolytes) on the surface of the colloidal product particles. The surface of a particle typically is composed of negative as well as positive sites. For instance, such charged sites may include functional groups including but not limited to $OH^-$, $H^+$, $O_2^-$, and $O^-$, among others. The relative concentration of each charge depends on a number of factors including the nature of particle, the oxidation state of the particle, and the pH of the system.

Polyelectrolytes have associated with them an overall electrical character (i.e., positive or negative). Polyelectrolytes adsorb strongly to the surface of particles by attaching themselves to oppositely charged sites on the surface of particles. Not all of the ionic sites on each polyelectrolyte, however, are used during the adsorption process. While some of the ionic sites are used to adsorb the polyelectrolyte to the surface of the particle, others of the ionic sites are in the part of the polymer that trails freely in the liquid medium. The combined like charges associated with the particle surface and polymer chains in solution give each particle an overall negative or positive charge for the particle-polymer composition. Each polymer-coated particle may repel the like charges associated with other polymer-coated particles because such particles experience an electronic repulsion. This electronic repulsion, in combination with the steric effect of the polymer, disperses the product suspension. Moreover, as both electrostatic and steric separation is achieved, particle separation is significantly stronger than either electrostatic or steric separation alone, resulting is less dispersant required, and less tight control requirements over the amount of dispersant used in the milling process.

Polyelectrolytes suitable for use in accordance with the present disclosure as electrosteric dispersants include functional polymers that have a number-average molecular mass of at least about 500 g/mol, for example at least about 1,000 g/mol, such as at least about 2,000 g/mol. In some embodiments, the functional polymers may have a number-average molecular mass as high as about 5 million, or even 50 million g/mol. Typically, though, the number-average molecular mass will be less than about 500,000 g/mol, such as less than about 100,000 g/mol, or less than about 50,000 g/mol, or less than about 25,000 g/mol. In particular, the polyelectrolyte dispersant may be chosen from polymers and copolymers having electrically-charged functional groups or inorganic affinic groups, alkylammonium salts of polymers and copolymers, polymers and copolymers having acidic groups, functionalized comb copolymers and block copolymers, modified acrylate block copolymers, modified polyurethanes, modified and/or salified polyamines, phosphoric polyesters, polyethoxylates, polymers and copolymers having fatty acid radicals, modified polyacrylates such as trans-esterified polyacrylates, modified polyesters such as acid-functional polyesters, polyphosphates, and mixtures thereof. Suitable electrosteric dispersants are sold under the trade names: Disperbyk-199 and Disperbyk-2010 (BYK GmbH, Wesel, DE); and Flexisperse 225 and Flexisperse 300 (ICT, Cartersville, GA, US), as non-limiting examples. In embodiments, the product suspension in the wet media mill may have an electrosteric dispersant content from about 2 wt.-% to about 20 wt.-%, such as from about 2 wt.-% to about 15 wt.-%, or about 5 wt.-% to about 15 wt.-%, based on the weight of the solid particles.

Milling Method

Figure 5:
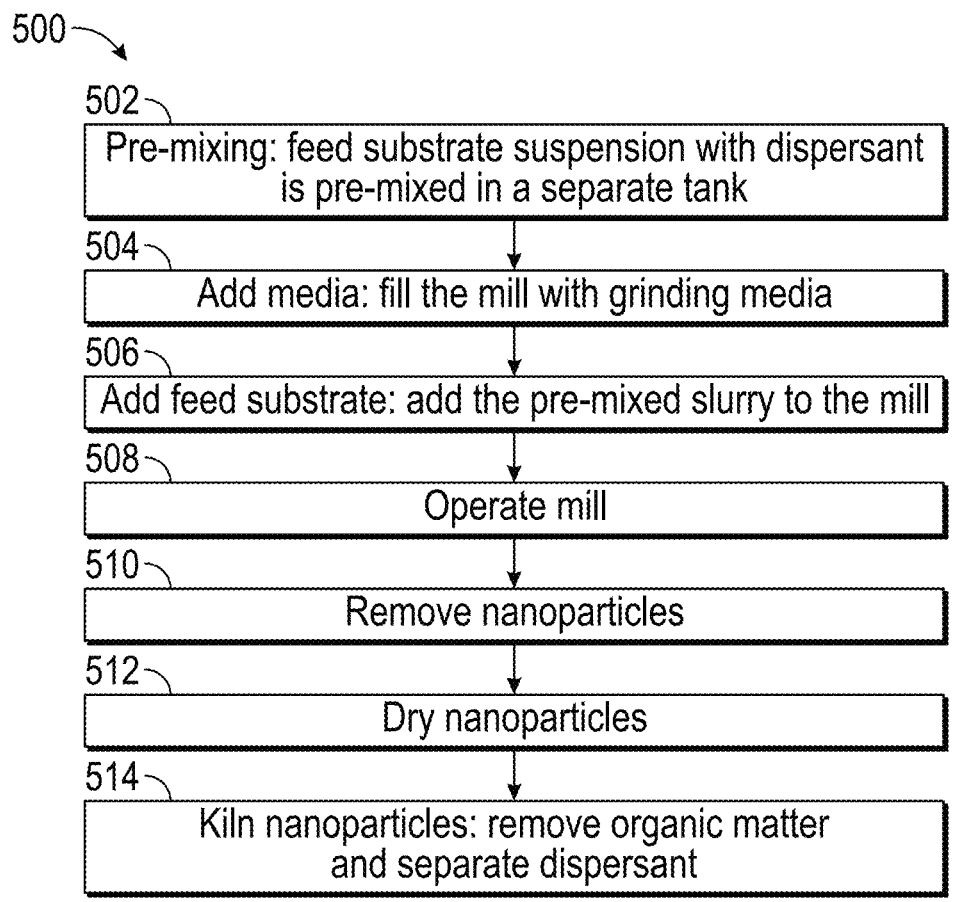
FIG. 5 is a flowchart illustrating a method for wet media milling in accordance with some embodiments of the present disclosure.
Figure 6A:
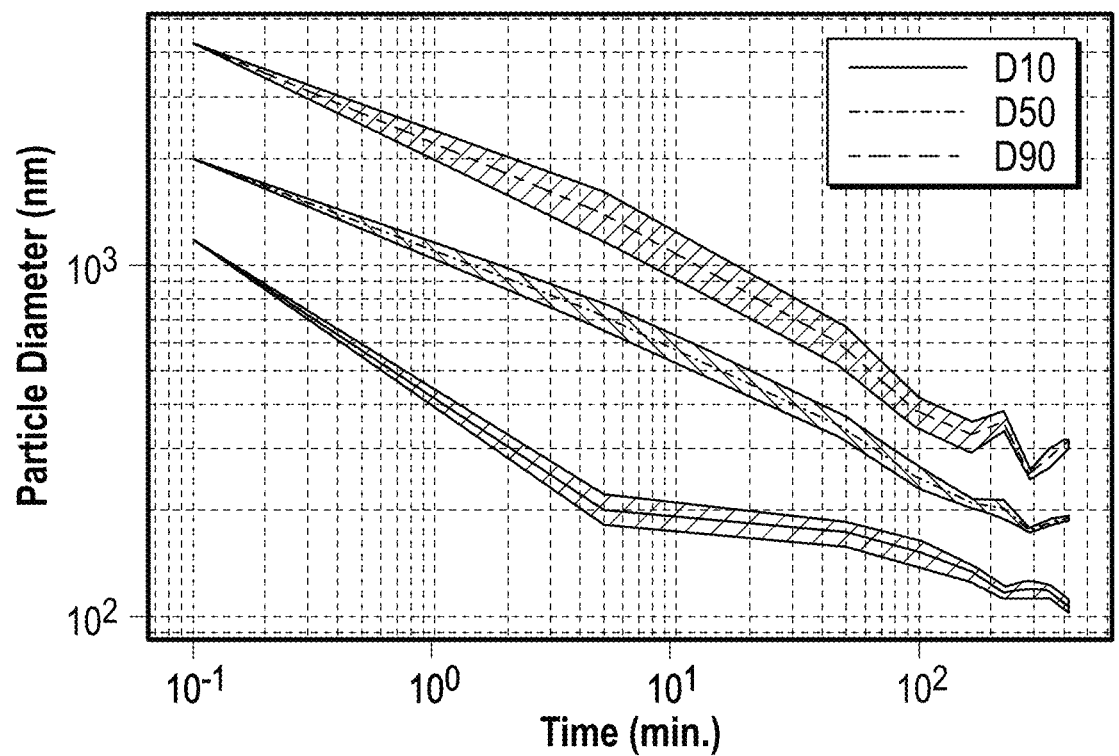
FIGS. 6A-6E are graphs illustrating average particle size diameters for particles produced in accordance with some examples of the present disclosure.
Figure 6B:
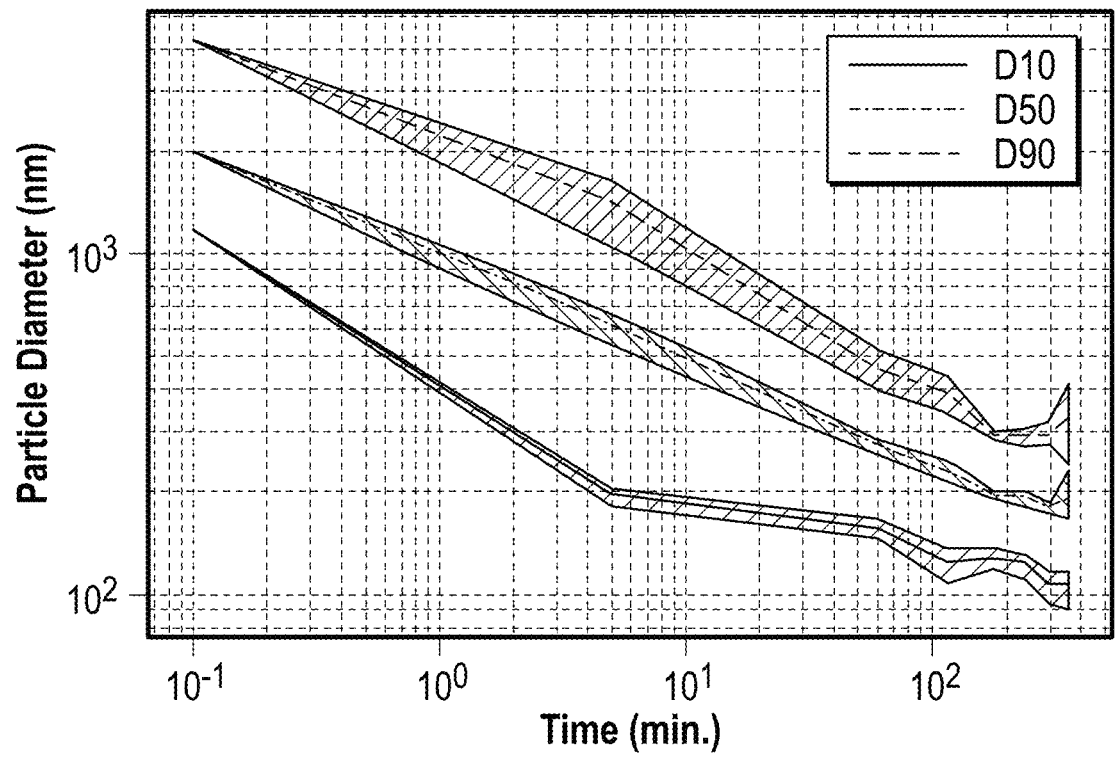
Figure 6C:
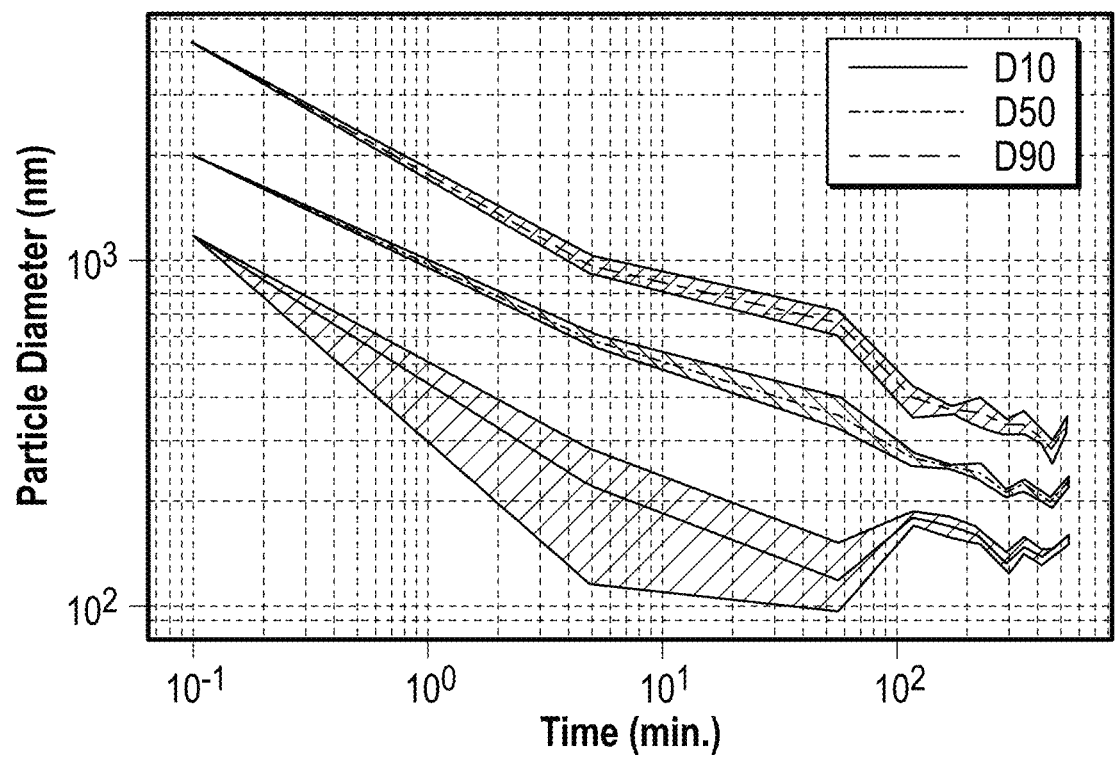
Figure 6D:
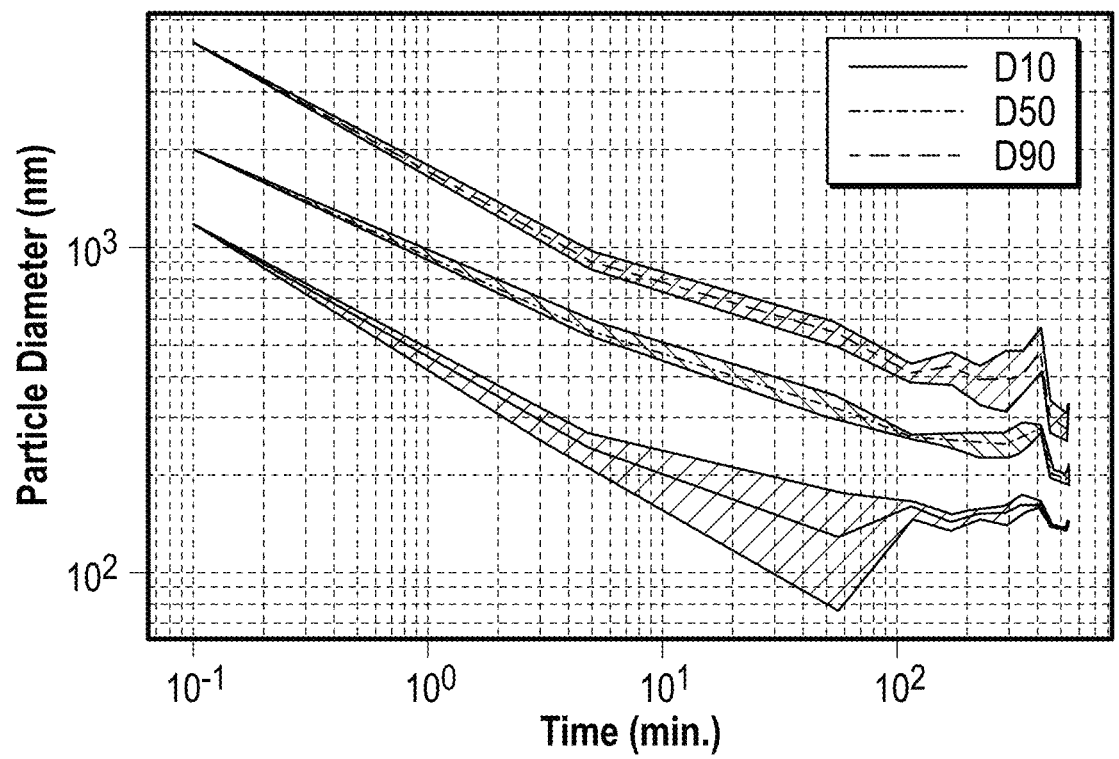
Figure 6E:
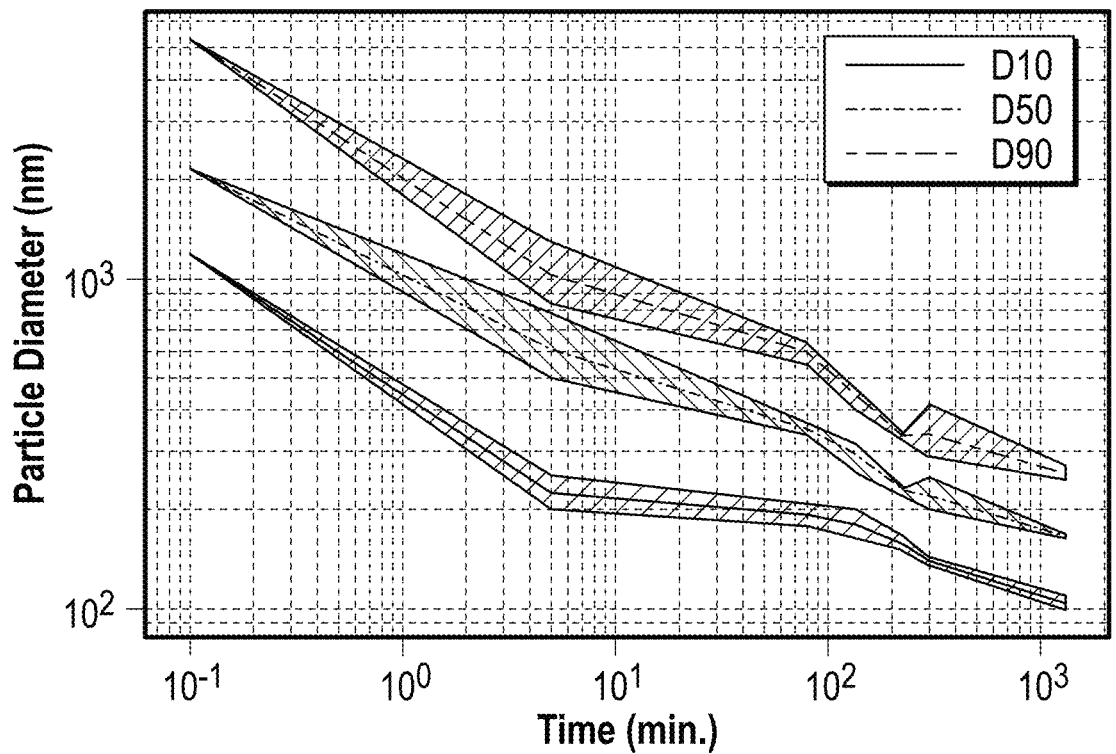

Referring to FIG. 5, illustrated is a flowchart for a method 500 for producing nanometer scale particles. The method 500 includes step 502 of pre-mixing, which is when the feed substrate suspension is pre-mixed with dispersant in a separate tank. The feed substrate suspension includes a liquid carrier medium and feed substrate particles. The liquid carrier medium may include water or an organic solvent. The feed substrate particles may include organic or inorganic solids, glass, graphene, metals, minerals, ores, silica, diatomaceous earth, clays, organic and inorganic pigments, pharmaceutical materials, or carbon black. The feed substrate particles may be present in the feed substrate suspension in an amount of about 5% to about 70% by weight of the feed substrate suspension, or about 5% to about 40% by weight. The electrosteric dispersant may be added in an amount of about 2% to about 20% by weight of the feed substrate particles. The electrosteric dispersant includes a polyelectrolyte. The polyelectrolyte may include a polymer or copolymer having electrically-charged functional groups or inorganic affinic groups.

The method 500 further includes a step 504 of adding milling/grinding media to the mill, that is, the mill is filled with an appropriate amount of milling/grinding media. Milling media are generally selected from a variety of dense and hard materials, such as sand, steel, silicon carbide, ceramics, zirconium silicate, zirconium and yttrium oxide (e.g. yttria stabilized zirconia), glass, alumina, titanium, and certain polymers such as crosslinked polystyrene and methyl methacrylate. Media geometries may vary depending on the application, although spherical ball-shapes or cylindrical beads are commonly used. In some embodiments, milling media may be of various sizes and size distributions that include large milling media particles and smaller milling media particles.

The method 500 further includes a step 506 of adding to a media mill the pre-mixed feed substrate suspension from step 502. The feed suspension may be added in a batch or continuous process. A defoaming agent may also optionally be added. Still further, the method 500 includes step 508 of operating the media mill for a period of time to comminute the feed substrate particles, thereby forming nanometer scale particles having a ($D_{90}$) particle size of less than about one micron, or less than about 800 nm, or less than about 500 nm, or less than about 400 nm. The period of time may be from about 10 minutes to about 6,000 minutes, or from about 10 minutes to about 3,000 minutes, or from about 10 minutes to about 1,000 minutes. Additional electrosteric dispersant may be added during the period of time that the media mill is operating.

Additionally, the method 500 includes step 510 of recirculating for further grinding the nanometer scale particles from the media mill. Part of this step may further include removing the nanometer scale particles from the media mill may include separating the nanometer scale particles from the milling media. Optionally, the method 500 may include a step 512 of drying the nanometers scale particles after removing the nanometer scale particles from the media mill. Optionally, the method 500 may include a step 514 of, using a kiln, separating the electrosteric dispersant from the nanometer scale particles and removing any organic matter after removing the nanometer scale particles from the media mill. It should be appreciated that various steps in method 500 may be repeated one or more times throughout the operation of the method.

Energy Storage Materials

As introduced above, in certain embodiments the method prepares nanometer scale particles for electrochemical materials, i.e., materials suitable for use in or as a component of an electrochemical device (e.g. batteries, supercapacitors, etc.). In specific embodiments, the nanometer scale particles for electrochemical materials are particularly useful in or as energy storage materials, such as electrodes (e.g. cathodes or anodes). In such embodiments, an electrochemical feed substrate is utilized in the method to prepare the feed substrate suspension.

The electrochemical feed substrate is not particularly limited, and may be or comprise any particulate material suitable for use in the method of the embodiments described herein. More specifically, the electrochemical feed substrate may be any material suitable for use in the media mill of the present embodiments to prepare nanometer scale particles, which may subsequently be used to prepare a component of an electrochemical device. For example, in some embodiments the electrochemical feed substrate comprises an energy storage material selected from anode active materials and cathode active materials (i.e., materials capable of anodic or cathodic performance, respectively), as described in further detail below. It will be appreciated, however, that the electrochemical feed substrate may also comprise a material suitable for making nanoparticles that can be utilized in components other than electrodes, such as separators, current collectors, or even multi-purpose composite materials.

With regard to suitable energy storage materials, those of skill in the art will readily understand that various precursor compounds may be employed in the preparation of an electrode, and certain compounds and compositions may be used in an anode in some applications yet in a cathode in others. As such, the particular materials described herein are not limited to a particular final application unless otherwise described. In general, suitable anodic energy storage materials may fall into a classification as intercalation-type anode material (e.g. graphite, lithium titanate), an alloy-type anode material (e.g. silicon, tin, germanium, and antimony compounds), or a conversion-type anode material (e.g. transition metal oxides, sulfides, etc.). Examples of particular anode active materials suitable for use in the method thus include carbon-based anode materials, such as those selected from graphite, graphene, activated carbon, pyrolyzed carbon, hard carbon, and combinations thereof. Likewise, a lithium titanate-based anode material may also be utilized. Additional examples include alloying anode-type materials, e.g. those comprising a transition metal oxide, sulfide, nitride, phosphide, fluoride, or a combination thereof. In yet further embodiments, the energy storage material may comprise a silicon-based anode material, a tin-based anode material, a germanium-based anode material, an antimony-based anode material, an aluminum-based anode material, a magnesium-based anode material, or any combination thereof.

The energy storage material may comprise a cathode active material. The cathode active material may be an inorganic cathode active material, an organic cathode active material, a polymeric cathode active material, or a combination thereof.

Examples include a cathode active material selected from metal oxides, metal phosphates, metal silicides, metal selenides, transition metal sulfides, and combinations thereof. In general, suitable cathode energy storage materials may fall into a classification as layered structural-type anode material (e.g. graphite, lithium titanate), spinel structural-type, an alloy-type anode material (e.g. silicon, tin, germanium, and antimony compounds), or a conversion-type anode material (e.g. transition metal oxides, sulfides, etc.). Polyanionic cathodic compounds may also be utilized.

The energy storage material utilized in the method may be selected based on a particular type of energy storage device being prepared with/from the nanometer scale particles. For example, $Li-O_2$ batteries, also called lithium-air batteries, may use cathodes that are carbon-based (e.g. activated carbon, carbon black, etc.), or include noble metals (e.g. gold, silver and palladium), non-noble metals (e.g. Ni/Ru particles, Co/Cu bimetallic nanoparticles based on graphene, etc.), transition metal oxides (e.g. $Fe_2O_3$, $Fe_3O_4$, NiO, CuO, $Co_3O_4$, etc.), and transition metal carbides (e.g. $Mo_2C$), sulfides, and nitrides; each of which may be utilized.

Lithium-sulfur (Li—S) batteries typically use high-capacity sulfur (S, 1675 $mAhg^{-1}$) cathodes and lithium metal anodes. In such devices, lithium polysulfide is absorbed on metal oxides such as $TiO_2$, $MnO_2$, $Nb_2O_5$, $Fe_3O_4$, whereas Lithium polysulfide is absorbed on metal sulfides such as $Ni_3S_2$, $SnS_2$, FeS, $CoS_2$, $VS_2$, and $TiS_2$. Both such classes of materials may be utilized in the present embodiments. In sodium-ion batteries, the anode materials are typically selected from graphite, hard carbon, soft carbon, titanium oxide, sodium titanate, and transition metal oxides, sulfides, nitrides, and phosphides of the general formula MaXb, where M is Fe, Co, Ni, Cu, and/or Mn, and X is O, N, F, S, Se, P, or H. Other materials include those where X is Si, Ge, Sn, Sb, or Bi. Other materials include cathode materials for zinc-ion batteries, such as cathode materials based on $MnO_2$, MnO, $Mn_2O_3$, $Mn_3O_4$ and $ZMn_2O_4$; and for zinc-air batteries, transition metal oxides such as $MnCo_2O_4$, $Co_3O_4$/$MnCo_2O_4$, $Co_3O_4$, $NiCo_2O_4$, or $Fe_3O_4$. Similarly, $V_2O_5$ and derivatives may also be utilized.

Figure 7:
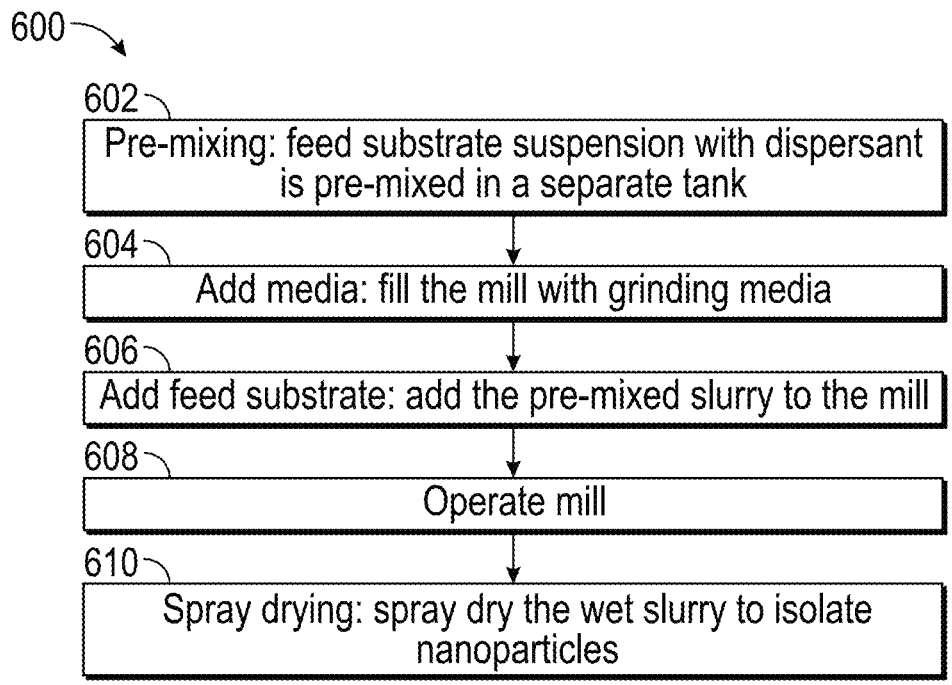
FIG. 7 is a flowchart illustrating a method for preparing energy storage materials via wet media milling and spray drying in accordance with some embodiments of the present disclosure.

Turning back to the method itself, reference FIG. 7 is made to illustrate the method of the present embodiments. Specifically, FIG. 7 shows a flowchart for the method at 600, which is the method for preparing nanometer scale particles. The method 600 includes step 602 of pre-mixing, which is when the feed substrate suspension (i.e., the electrochemical feed substrate particles) are pre-mixed with the dispersant in a separate tank. The electrochemical feed substrate suspension includes a liquid carrier medium and feed substrate particles. The liquid carrier medium may include water or an organic solvent. The electrochemical feed substrate particles typically include one of the energy storage materials set forth above, or another compound for electrochemical use.

The method 600 further includes a step 604 of adding milling/grinding media to the mill, as set forth above. In some embodiments, milling media may be of various sizes and size distributions that include large milling media particles and smaller milling media particles. The method 600 further includes a step 606 of adding to a media mill the pre-mixed feed substrate suspension from step 602. The feed suspension may be added in a batch or continuous process. A defoaming agent may also optionally be added. Still further, the method 600 includes step 608 of operating the media mill for a period of time to comminute the feed substrate particles, thereby forming nanometer scale particles (e.g. having a ($D_{90}$) particle size of less than about one micron, alternatively less than about 800 nm, or less than about 500 nm, or less than about 400 nm. While not shown, the method 600 typically includes a step of recirculating the milled/unmilled feed substrate, e.g. for further grinding to achieve the nanometer scale particles from the media mill. Part of this step may further include removing the nanometer scale particles from the media mill, and may include separating the nanometer scale particles from the milling media as in the other embodiments described herein.

In certain embodiments, the method 600 includes a step 610 of drying the nanometers scale particles after removing the nanometer scale particles from the media mill. Typically, step 610 is carried out via spray drying. For example, in some embodiments the slurry obtained after the drinking process is pumped through a nozzle with high pressure air, which atomizes the liquid slurry into fine droplets. The droplets are then passed through a heating chamber where the liquid (e.g. the is evaporated and forming dry powder. The dry powder is then pneumatically conveyed and collected in a cyclone separator and/or bag filter. It will be appreciated that step 610 may be performed directly sequentially with the step 608, i.e., where a wet slurry comprising the now nanometer scale particles may be introduced into the spray-dryer immediately upon completion of the milling.

While not shown, it is to be appreciated that the method may include separating the electrosteric dispersant from the nanometer scale particles and removing any organic matter, after removing the nanometer scale particles from the media mill. It should be appreciated that various steps in method 600 may be repeated one or more times throughout the operation of the method.

The nanometer scale particles prepared via the method may be used to prepare electrochemical materials. In this fashion, the electrochemical feed substrate may be considered a precursor, or intermediate, in the preparation of one or more electrochemical materials. For example, in certain embodiments, the nanometer scale particles are used to prepare an electrode.

It has recently been shown that by reducing solid electrolyte particle size and increasing the cathode active material particle size, over 50 vol % cathode active material loading with high cathode utilization is able to be experimentally achieved, demonstrating that a commercially-relevant, energy-dense cathode composite is achievable through simple mixing and pressing method. It has also been shown that possible to prepare a solid-state cathode composite with liquid-cell-level cathode volume loading ($\approx$50 vol %) by using large cathode particles ($\approx$12 μm) and small SE particles ($\approx$1.5 μm). In view of these observations, it will be understood that particle size optimization in electrodes can enable commercially relevant cathode loading. Moreover, the nanometer scale particles of the present embodiments can be readily pressed into electrodes (e.g. energy storage materials) via methods known to those of skill in the art.

EXAMPLES

The present disclosure is now illustrated by the following non-limiting examples. It should be noted that various changes and modifications may be applied to the following examples and processes without departing from the scope of this invention, which is defined in the appended claims. Therefore, it should be noted that the following examples should be interpreted as illustrative only and not limiting in any sense.

Examples 1-5: Preparation of Nanometer-Scale Particles

Five different example particle suspensions were prepared including a water (as the liquid medium), crystalline silica/quartz particles or diatomaceous earth particles (as the solid substrate), a defoaming agent, and various types and amounts of polyelectrolyte (as the electrosteric dispersant). The composition of each example slurry is presented below in TABLE 1.

TABLE 1

| | [4]Example 1 | [4]Example 2 | Example 3 | Example 4 | Example 5 |
|---|---|---|---|---|---|
| Feed | Crystalline Silica/Quartz | Crystalline Silica/Quartz | Crystalline Silica/Quartz | Crystalline Silica/Quartz | Diatomaceous Earth |
| Feed Size ($D_{90}$)[1] | 5 microns | 5 microns | 5 microns | 5 microns | 50 microns |
| Solids Concentration | 30 wt.-% | 35 wt.-% | 37.5 wt.-% | 35 wt.-% | 20 wt.-% |
| Dispersant | Flexisperse[2] 225 | Flexisperse 225 | Disperbyk[3] 199 | Disperbyk 199 | Disperbyk 199 |
| Dispersant Concentration (by weight of solids) | 5% | 5% | 5% | 5% | 10% |
| Grinding Media Volume (% of Mill Volume) | 80% | 80% | 67% | 67% | 67% |
| Grinding Media Size | 0.1-0.2 mm | 0.1-0.2 mm | 0.1-0.2 mm | 0.1-0.2 mm | 0.1-0.2 mm |
| Mill Tip Speed | 14.7 m/s | 14.7 m/s | 17.6 m/s | 17.6 m/s | 8.8 m/s |

[1]Feed size measured using a laser particle analyzer (Microtrac S3500; available from Microtrac Retsch GmbH (Haan, Germany))
[2]Flexisperse 225 available from Innovative Chemical Technologies (Cartersville, GA, USA)
[3]Disperbyk 199 available from BYK-Chemie GmbH (Wesel, Germany)
[4]No defoaming agent used Each of the example particle suspensions was placed into a circulating stirred media mill (VMA Dispermat SL12, available from VMA-GETZMANN GmbH (Reichshof, Germany)) that also included yttria stabilized zirconia (YSZ) beads as the grinding media. Each example was subjected to wet media milling in the stirred media mill for a time period ranging from about 150 minutes to about 1,000 minutes. After the milling was completed, the product particles were measured for $D_{10}$, $D_{50}$, and $D_{90}$ mean particle size using a nanoparticle analyzer (Anton-Paar Litesizer 500 (available from Anton Paar GmbH, Graz, Austria)). The mean particle sizes, as a function of milling time, for each of Examples 1-5, are presented in FIGS. 6A-6E, respectively. As shown in those Figures, methods in accordance with the present disclosure are readily able to achieve $D_{10}$ mean particle sizes of about 100 nm to about 200 nm, $D_{50}$ mean particle sizes of about 150 to about 250 nm, and $D_{90}$ mean particle sizes of about 250 nm to about 350 nm.

As such, the present disclosure has provided embodiments of methods and apparatus for producing nanometer scale particles utilizing an electrosterically stabilized slurry in a media mill. The methods and apparatus beneficially maintain particle separation as the particle size decreases below about 1 micron to avoid agglomeration and mill screen blockage. Moreover, the methods and apparatus are beneficially suitable for industrial scale manufacturing to the extent that tight control of any additives is not required to prevent product suspension flocculation or steep increases in viscosity.

General Procedure for the Preparation of Nanometer Scale Particles for Energy Storage Devices In preparing the nanometer-scale particles, feed materials (e.g. quartz, diatomaceous earth, etc.) is combined with a solvent (e.g. water) along with a dispersant (e.g. Flexisperse 225 from ICT Chemicals) in a tank for 30 to 60 minutes. The resulting mixture is in a liquid in the form a slurry containing water and solids.

The slurry is then continuously recirculated through a stirred media mill for a specified amount of time. The stirred media mill is then charged with a grinding media (Y—$ZrO_2$ ceramic particles with sizes ranging from 0.05 mm to 10 mm). Only one size of media is used during a test run. For example, in a test run 0.1 mm media size will be charged into the chamber of the mill. A mixture of media sizes is generally not used in a stirred media milling process. The time of grinding is determined by the total amount of mill power input into the grinding process.

After completion of the grinding process, the slurry is pumped through a nozzle with high pressure air. The high-pressure air atomizes the liquid slurry into fine droplets. These droplets are then passed through a heater chamber where the liquid is evaporated and forming dry powder. The dry powder is then pneumatically conveyed and collected in a cyclone separator and/or bag filter.

Examples 6-7: Preparation of Nanometer-Scale Particles

Figure 8A:
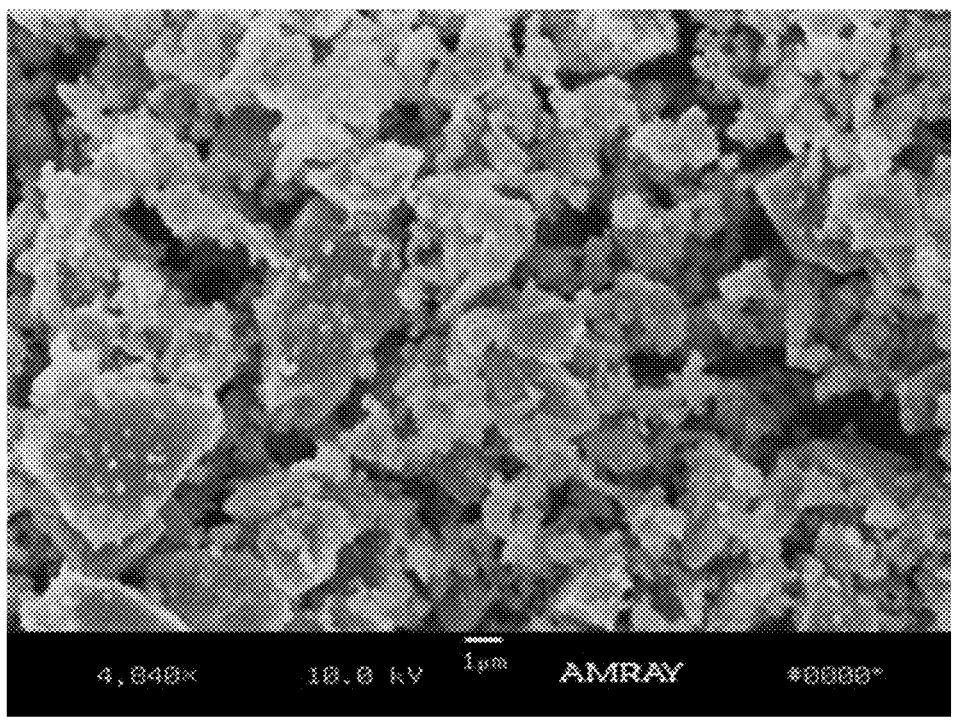
FIGS. 8A and 8B are scanning electron microscope (SEM) micrographs of feed materials utilized in the examples.

Example 6: 35 kg of Minusil-5 (Crystalline Quartz) with initial particle size of $D_{90}$=5 μm is mixed in 35 kg of water and 2.1 kg of Flexisperse 225 for 30 minutes in a tank. The mill is a Netzsch NEOS10, which is 10 L mill chamber, and is charged with 27.83 kg of Y—Zr ceramic media with size of 0.3 mm. The resulting slurry is then circulated through the mill for a total of 1380 minutes and a total input power of 571 kWh was consumed in the process. FIG. 8A provides a SEM micrograph of the feed material Minusil-5.

Figure 8B:
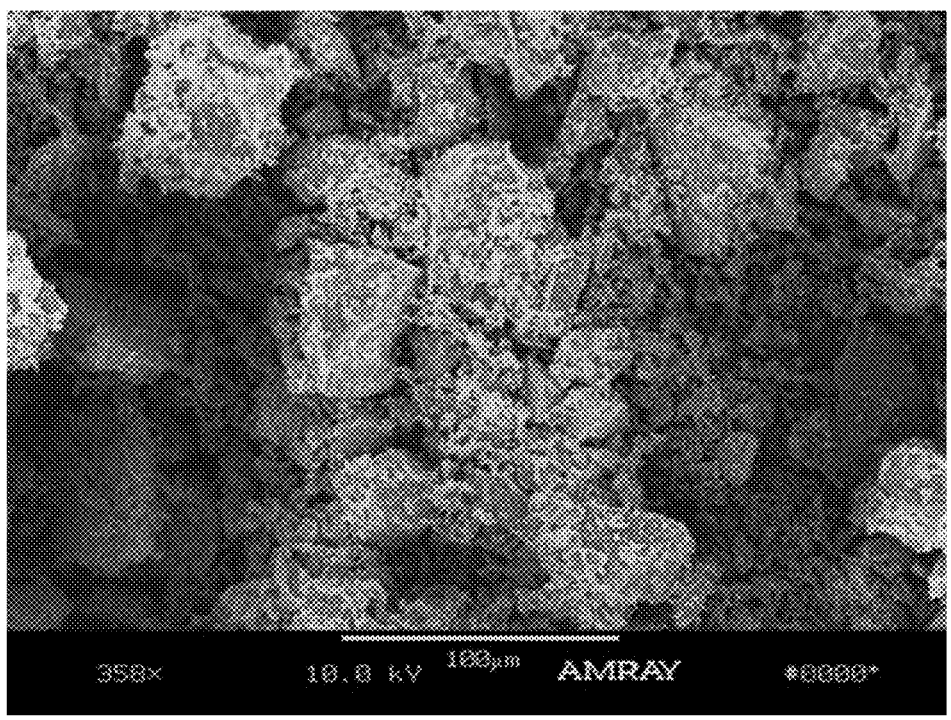

Example 7: 25 kg of Silcosil-75 (Crystalline Quartz) with initial particle size of $D_{90}$=75 μm is mixed in 25 kg of water and 1.25 kg of Flexisperse 225 for 12 hours. The mill is a Netzsch NEOS10, which is 10 L mill chamber, and is charged with 27.83 kg of Y—Zr ceramic media with size of 0.3 mm. The slurry is then circulated through the mill for a total of 960 minutes and a total input power of 404 kWh was consumed in the process. FIG. 8B provides a SEM micrograph of the feed material Silcosil-75.

Figure 9:
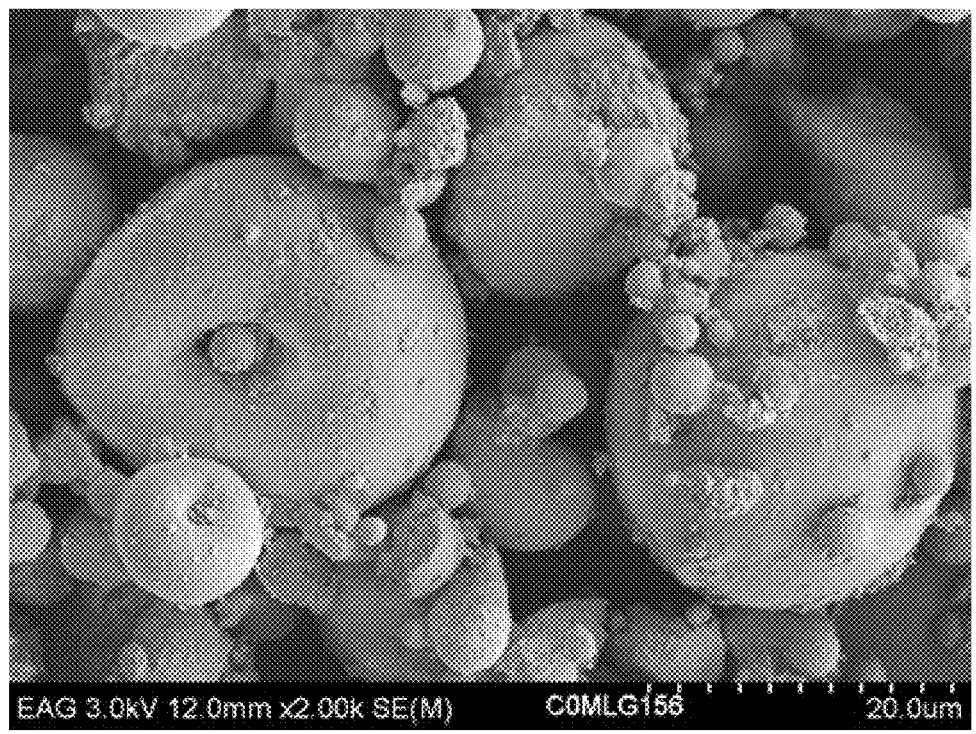
FIG. 9 is a SEM micrograph of a spray dried agglomerate of primary nanoparticles prepared in the examples.
Figure 10A:
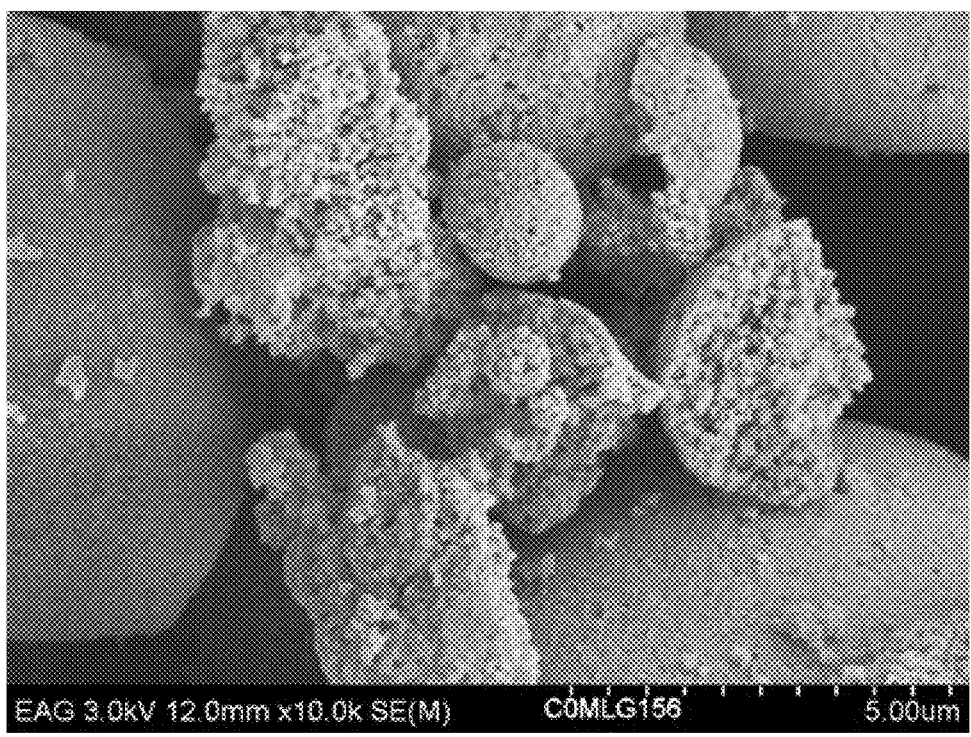
FIGS. 10A-10E are SEM micrographs of a spray dried agglomerate prepared in the examples, showing various views of the primary nanoparticles therein.
Figure 10B:
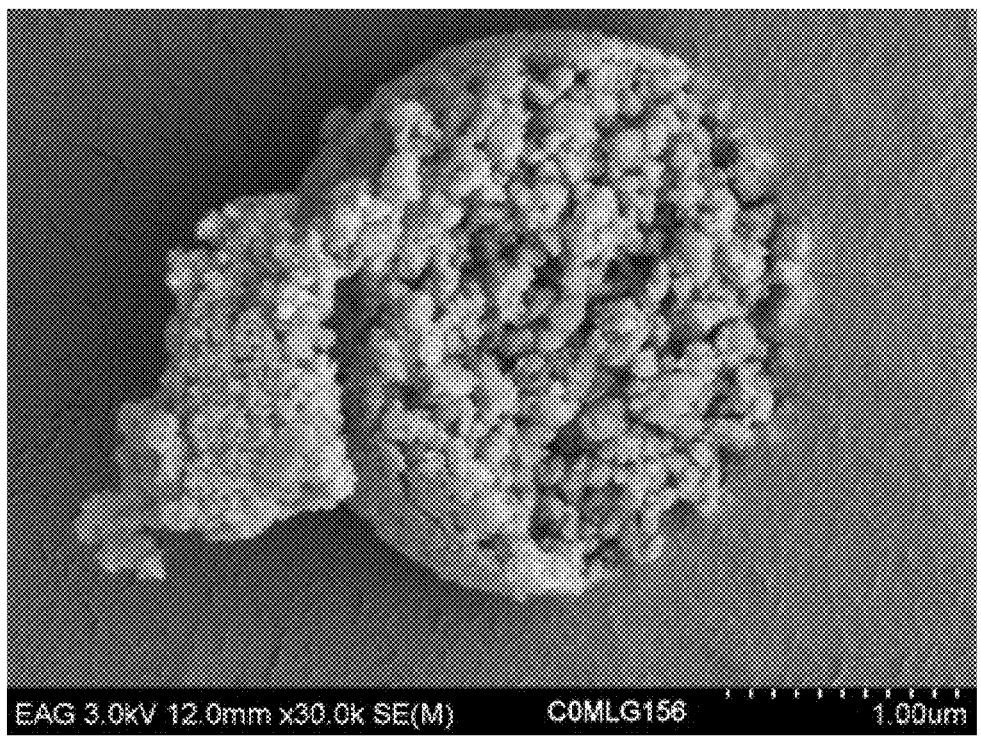
Figure 10C:
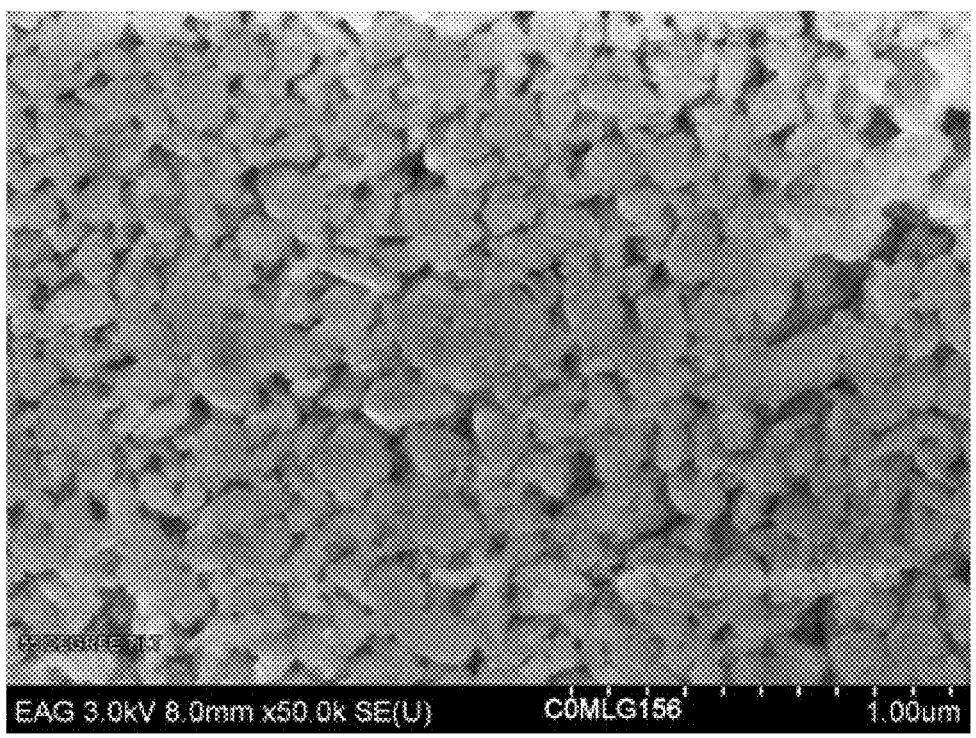
Figure 10D:
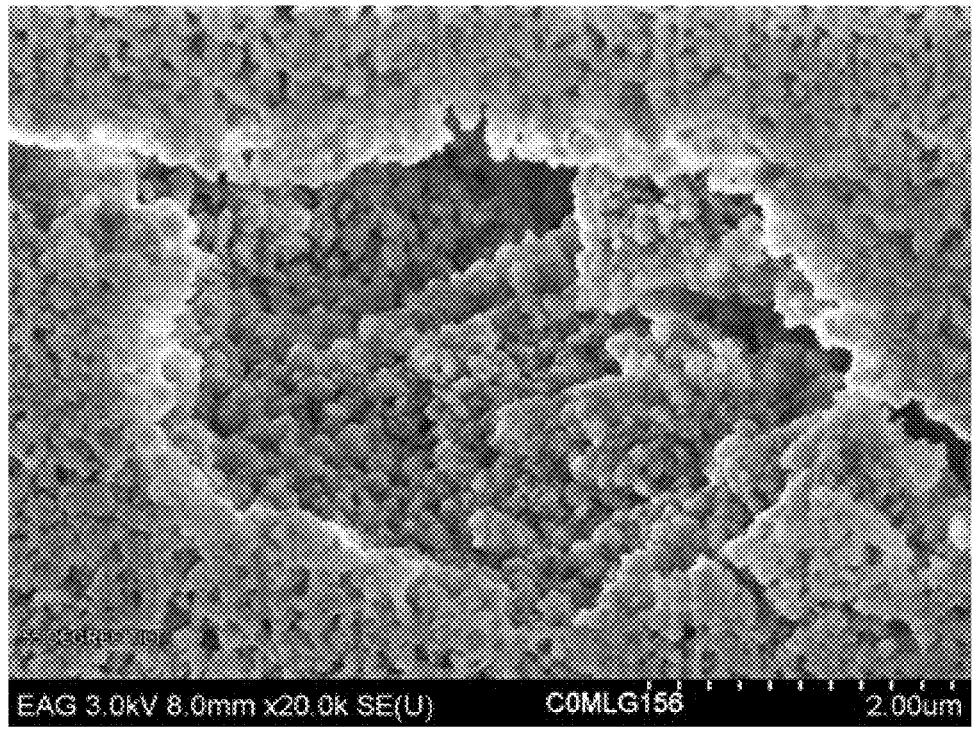
Figure 10E:
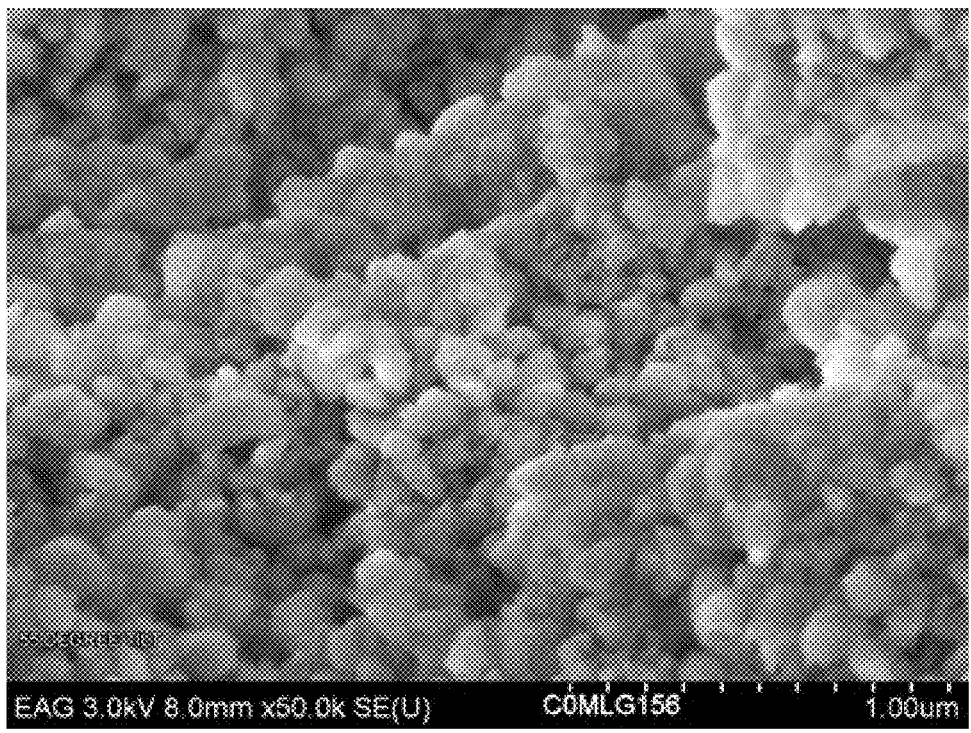

FIG. 9 provides a SEM micrograph of the spray dried agglomerate of the nanometer scale particles prepared in Examples 6-7. These round agglomerates have particle sizes ranging from 5 μm to 50 μm and consist of primary nanoparticles. FIGS. 10A-10E show the agglomerates comprise primary nanoparticles. These nanoparticles are about 100 nm to 200 nm in diameter.

It has been found that the instant method can readily mill down 75 μm crystalline quartz to 100 nm. As quartz is an extremely hard material, and often difficult to process, many battery precursor materials (which are typically known as softer materials) can also be ground with the techniques of the present embodiments. As such, the method provides an expedient route toward preparing electrochemical materials, e.g. as battery precursors, even from difficult to process materials.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the inventive methods and apparatus. It is understood that various changes may be made in the function and arrangement of elements described in an exemplary embodiment without departing from the scope of the invention as set forth in the appended claims.

What is claimed is:

1. A method preparing nanometer scale particles for electrochemical materials, comprising:
   providing a media mill;
   adding to the media mill a feed substrate suspension, wherein the feed substrate suspension comprises a liquid carrier medium and electrochemical feed substrate particles, wherein the electrochemical feed substrate particles comprise an energy storage material selected from anode active materials and cathode active materials;
   adding to the feed substrate suspension in the media mill an electrosteric dispersant to separate the feed substrate particles in the feed substrate suspension in order to improve spacing of the feed substrate particles, wherein the electrosteric dispersant comprises a polyelectrolyte;
   operating the media mill for a period of time to comminute the electrochemical feed substrate particles, thereby forming nanometer scale particles having a ($D_{90}$) particle size of less than one micron; and
   recirculating for further grinding the nanometer scale particles from the media mill.

2. The method of claim 1, wherein the liquid carrier medium comprises water or an organic solvent.

3. The method of claim 1, wherein the energy storage material comprises: (i) an intercalation anode material; (ii) an alloy anode material; (iii) a conversion anode material; or (iv) any combination of (i)-(iii).

4. The method of claim 1, wherein the energy storage material comprises: (i) a carbon-based anode material selected from graphite, graphene, activated carbon, pyrolyzed carbon, hard carbon, and combinations thereof; (ii) a lithium titanate-based anode material; or (iii) both (i) and (ii).

5. The method of claim 1, wherein the energy storage material comprises an alloying anode material comprising a transition metal oxide, sulfide, nitride, phosphide, fluoride, or a combination thereof.

6. The method of claim 1, wherein the energy storage material comprises: (i) a silicon-based anode material; (ii) a tin-based anode material; (iii) a germanium-based anode material; (iv) an antimony-based anode material; (v) an aluminum-based anode material; (vi) a magnesium-based anode material; or (vii) any combination of (i)-(vi).

7. The method of claim 1, wherein the energy storage material comprises an inorganic cathode active material, an organic cathode active material, a polymeric cathode active material, or a combination thereof.

8. The method of claim 1, wherein the energy storage material comprises a cathode active material selected from metal oxides, metal phosphates, metal silicides, metal selenides, transition metal sulfides, and combinations thereof.

9. The method of claim 8, wherein the cathode active material comprises a layered structural cathodic compound, a spinel structural cathodic compound, an olivine cathodic compound, a polyanionic cathodic compound, or a combination thereof.

10. The method of claim 1, wherein the electrochemical feed substrate comprises a separator material comprising an inorganic ceramic.

11. The method of claim 1, wherein the polyelectrolyte of the electrosteric dispersant comprises a polymer or copolymer having electrically-charged functional groups or inorganic affinic groups.

12. The method of claim 1, wherein the feed substrate suspension comprises: (i) from 5 to 70 wt. % of the electrochemical feed substrate particles; (iii) from 2 to 20 wt. % of the electrosteric dispersant; or (iii) both (i) and (ii), based on the total weight of the feed substrate suspension.

13. The method of claim 1, wherein: (i) the period of time is from 10 to 6,000 minutes; (ii) the nanometer scale particles have a ($D_{90}$) particle size of less than 500 nm; or (iii) both (i) and (ii).

14. The method of claim 1, wherein the media mill comprises a milling media, and wherein recirculating for further grinding the nanometer scale particles from the media mill further comprises separating the nanometer scale particles from the milling media.

15. The method of claim 14, wherein: (i) the milling media comprises one or more of sand, steel, silicon carbide, ceramics, zirconium silicate, zirconium and yttrium oxide, glass, alumina, titanium, crosslinked polystyrene, and methyl methacrylate; (ii) the milling media are provided in the shape of one or more of balls, beads, and cylinders; or (iii) both (i) and (ii).

16. The method of claim 1, further comprising drying the nanometer scale particles after recirculating for further grinding the nanometer scale particles from the media mill.

17. The method of claim 16, wherein drying the nanometer scale particles is carried out via spray drying.

18. The method of claim 17, wherein further grinding the nanometer scale particles from the media mill gives a slurry, and wherein the slurry is subjected directly to the spray drying to give the nanometer scale particles as a dry powder.

* * * * *